US010337698B2

(12) United States Patent
Gattari

(10) Patent No.: US 10,337,698 B2
(45) Date of Patent: Jul. 2, 2019

(54) DEVICE FOR SHAPING LIGHT BEAMS EMITTED BY LIGHTING FIXTURES

(71) Applicant: Iguzzini Illuminazione S.P.A., Recanati (IT)

(72) Inventor: Massimo Gattari, Potenza Picena (IT)

(73) Assignee: Iguzzini Illuminazione S.P.A., Recanati (IT)

( * ) Notice: Subject to any disclaimer, the term of this patent is extended or adjusted under 35 U.S.C. 154(b) by 115 days.

(21) Appl. No.: 15/039,343

(22) PCT Filed: Nov. 27, 2014

(86) PCT No.: PCT/IB2014/066394
§ 371 (c)(1),
(2) Date: May 25, 2016

(87) PCT Pub. No.: WO2015/079405
PCT Pub. Date: Jun. 4, 2015

(65) Prior Publication Data
US 2017/0023210 A1    Jan. 26, 2017

(30) Foreign Application Priority Data
Nov. 29, 2013 (IT) ................. FI2013A0290

(51) Int. Cl.
| F21V 11/12 | (2006.01) |
| F21V 11/14 | (2006.01) |
| G02B 19/00 | (2006.01) |
| F21V 17/12 | (2006.01) |

(Continued)

(52) U.S. Cl.
CPC .............. *F21V 11/14* (2013.01); *F21V 11/12* (2013.01); *G02B 19/0028* (2013.01); *G02B 19/0061* (2013.01); *F21V 13/02* (2013.01); *F21V 17/12* (2013.01); *F21Y 2115/10* (2016.08)

(58) Field of Classification Search
CPC .......... F21V 11/14; F21V 11/12; F21V 17/12; F21V 11/08; G02B 19/0028; G02B 19/0061; G02B 19/0066
See application file for complete search history.

(56) References Cited

U.S. PATENT DOCUMENTS 3,748,643 A * 7/1973 Jacobs ................... B60Q 1/447
                                                            362/540
4,244,652 A * 1/1981 Berger ................... A61B 5/107
                                                            250/214.1
(Continued)

FOREIGN PATENT DOCUMENTS

DE       2810432    9/1978
DE      19714483   10/1998
(Continued)

*Primary Examiner* — Y M. Lee
(74) *Attorney, Agent, or Firm* — Stetina Brunda Garred & Brucker

(57) ABSTRACT

A device adapted to perform the shaping of light beams emitted by lighting fixtures, in particular by lighting fixtures comprising punctiform light sources such as, for example, LEDs. The device according to the present invention, in particular, allows shaping the light flow produced by lighting devices comprising punctiform light sources, so as to filter any parasitic reflection phenomena of the light flow emitted.

6 Claims, 6 Drawing Sheets

(51) Int. Cl.
 *F21V 13/02* (2006.01)
 *F21Y 115/10* (2016.01)

(56) References Cited

U.S. PATENT DOCUMENTS

| | | | | |
|---|---|---|---|---|
| 4,459,644 A | * | 7/1984 | Bailly | F21S 48/2218 |
| | | | | 362/240 |
| 2013/0100696 A1 | * | 4/2013 | Brick | F21K 9/00 |
| | | | | 362/603 |
| 2014/0168996 A1 | * | 6/2014 | Kajiwara | F21V 5/04 |
| | | | | 362/311.02 |
| 2014/0210333 A1 | * | 7/2014 | Kang | F21V 7/0016 |
| | | | | 313/46 |

FOREIGN PATENT DOCUMENTS

| | | |
|---|---|---|
| DE | 102005006758 | 8/2006 |
| EP | 1541920 | 6/2005 |
| JP | S56141305 | 10/1981 |

* cited by examiner

DEVICE FOR SHAPING LIGHT BEAMS EMITTED BY LIGHTING FIXTURES

CROSS REFERENCE TO RELATED APPLICATIONS

The present application claims priority to PCT International Application No. PCT/IB2014/066394 filed on Nov. 27, 2014, 2014, which application claims priority to Italian Patent Application No FI2013A000290 filed Nov. 29, 2013, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to the technical field of lighting fixtures and in particular to the technical field of lighting fixtures comprising punctiform lighting sources such as light emitting diodes or LEDs.

PRIOR ART

Lighting techniques have undergone, in relatively recent times, major changes, thanks to the availability of lighting sources such as LEDs, which provide control and flexibility of use unknown until recently.

The small size of the LEDs and their ability to emit light beams increasingly intense that radiate from very small and approximately punctiform surfaces, offer the possibility, with the use of appropriate lenses, screens and reflectors, to shape at will the light beam emitted in a much more radical way than is possible with lighting sources of the filament or fluorescent type.

In addition, the use of LEDs allows making particularly small and compact lighting fixtures and this feature leads to considerable potential in the field of design architecture and lighting.

The lighting fixture is described in the Italian patent application No. FI2013A000078, filed by the same applicant of the present application, enables the creation of lighting flows affecting only a particular solid angle and can be almost two-dimensional and laminar, thanks to the coupling between punctiform lighting sources, preferably LEDs, and optics created so as to collimate the light flow emitted and confine it in a precise region in space.

In the case of nearly laminar and two-dimensional emissions, parasitic reflection phenomena of the beam emitted or part thereof may give rise, in certain cases, to undesired light effects. Among these undesired light effects there may be, for example, undesired side emissions orthogonally to the main direction of the light flow, as shown in the accompanying FIG. 1, or even emissions that deviate from the main direction of emission by a certain angle and resolve in the projection, on the surface to be illuminated, of light smears as those shown in the accompanying FIG. 2.

The device according to the present invention considerably reduces the problems described and allows shaping the flow produced by lighting devices adapted to emit nearly laminar and substantially two-dimensional light flows, in order to mask any parasitic reflection phenomena of the light flow emitted.

BRIEF DESCRIPTION OF THE FIGURES

Further objects and advantages of the present invention will become more apparent from the following detailed description, given by way of a non limiting example and shown in the accompanying figures, in which.

SUMMARY OF THE INVENTION

A first object of the present invention is to implement a device adapted to perform the shaping of light beams emitted by lighting fixtures, in particular by lighting fixtures comprising punctiform light sources such as, for example, LEDs. The device according to the present invention, in particular, allows shaping the light flow produced by lighting devices comprising punctiform light sources, so as to filter any parasitic reflection phenomena of the light flow emitted.

A second object of the present invention is to implement a lighting fixture, in particular a lighting fixture comprising punctiform light sources such as LEDs, provided with a device adapted to perform the shaping of light beams.

DETAILED DESCRIPTION OF THE INVENTION

The present description and the accompanying drawings are to be considered as illustrative and not limiting the present invention, which may be implemented according to other and different embodiments, still falling within the appended claims, which also are an integral part of the text.

With reference to the accompanying figures, the device according to the present invention includes a screen of opaque material adapted to be arranged in the vicinity of punctiform light sources, such as LEDs, of lighting, fixtures adapted, in particular, to emit light flows limited to a certain solid angle and having two dimensions much greater than the third so as to be essentially two-dimensional.

Said screen is provided, at said punctiform light sources, with slots which allow the passage of the main direct light flow, emitted by said light sources, and to prevent the passage of any secondary light flows due to reflection phenomena affecting said main light flow.

The accompanying FIGS. 3a-3e and 4 show lighting fixtures adapted to emit nearly laminar and substantially two-dimensional light flows of the type described, in the Italian patent application FI2013A000078.

Said lighting fixtures include an optical group, in turn comprising at least one punctiform lighting source and a screen, that is associated with said at least one punctiform lighting source, having a surface of approximately toroidal or half-toroidal shape with convexity facing outwards, said at least one punctiform light source being arranged at the median plane of said screen, facing towards said screen and adapted to produce, as a result of the combination with said screen, a collimated light beam having a median emission plane approximately coinciding with the median plane of said screen and a very small side extension to project an approximately laminar light trace.

Figure 1:
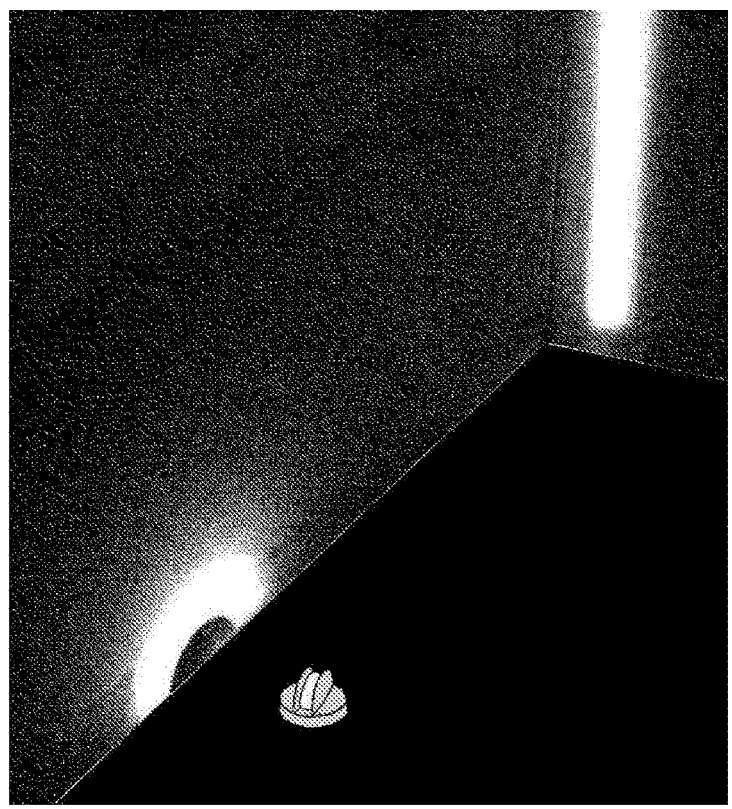
FIG. 1 shows the problem of undesired side emissions orthogonally to the main direction of the light flow in lighting devices adapted to emit nearly laminar and substantially two-dimensional light flows.
Figure 2:
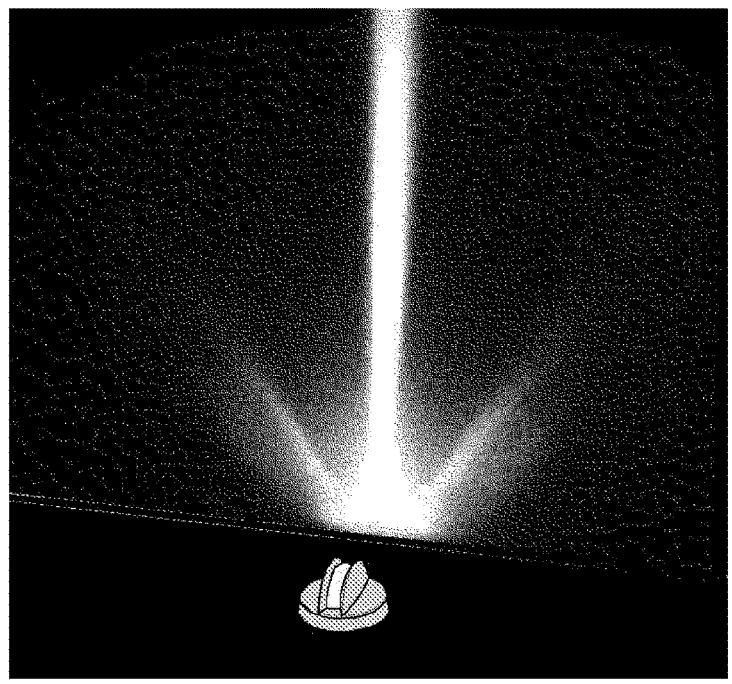
FIG. 2 shows the problem of light emission that deviate from the main direction of emission by a certain angle, and resolve in the projection, on the surface to be illuminated, of light smears, in lighting fixtures adapted to emit nearly laminar and substantially two-dimensional light flows.

The light beam produced by said fixture deviates from the ideal flow because of the reflections that part of the light emitted by the punctiform Heat sources undergoes on the inner walls of the fixture itself and which produce a resulting angle of emission β greater than the desired ideal angle α, giving rise to the parasitic effects described above and shown in the accompanying FIGS. 1 and 2.

Figure 3:
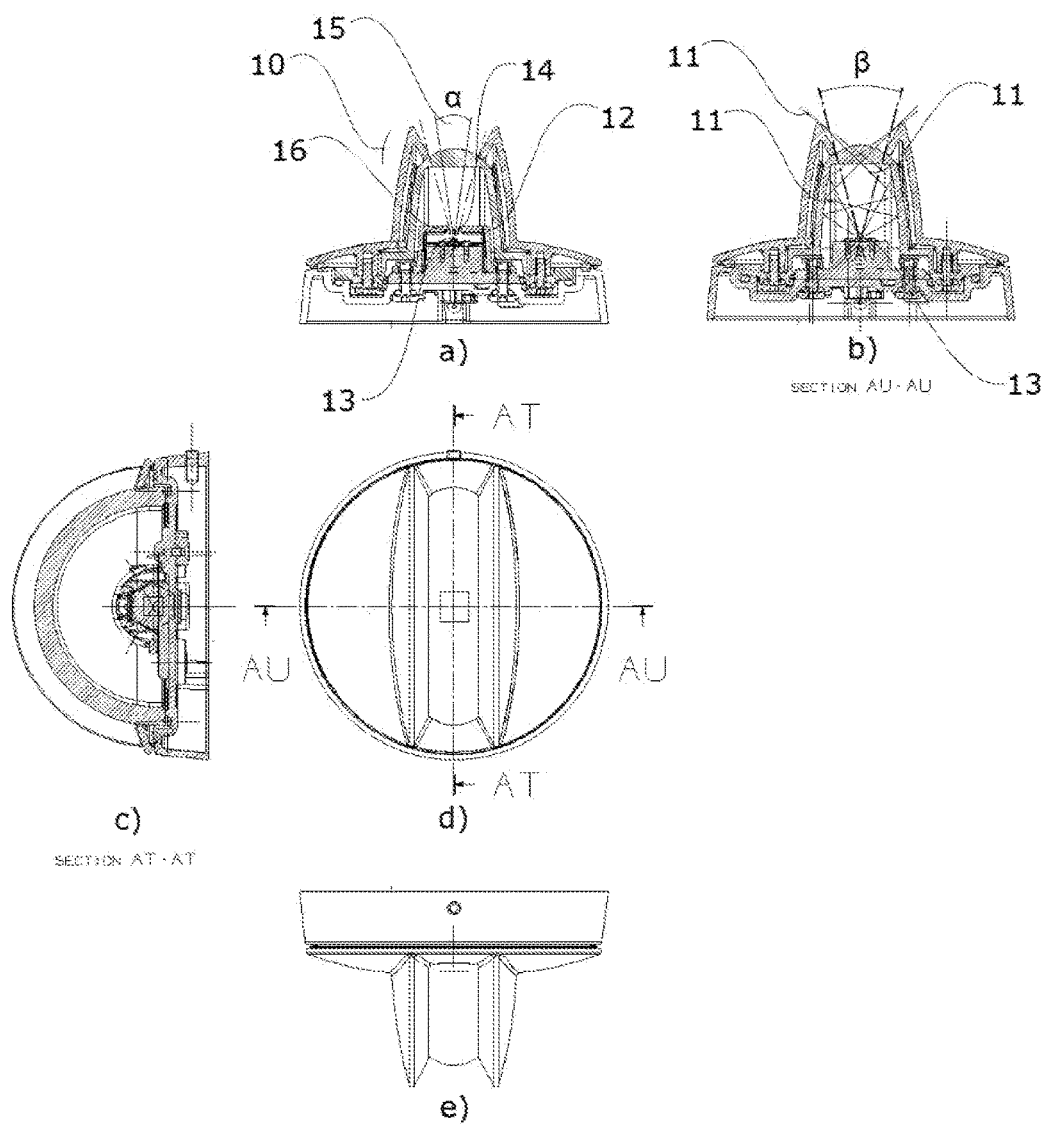
FIG. 3A-3e show a first example of a lighting fixture adapted to emit nearly laminar and substantially two-dimensional light flows, comprising the device according to the present invention.
Figure 4:
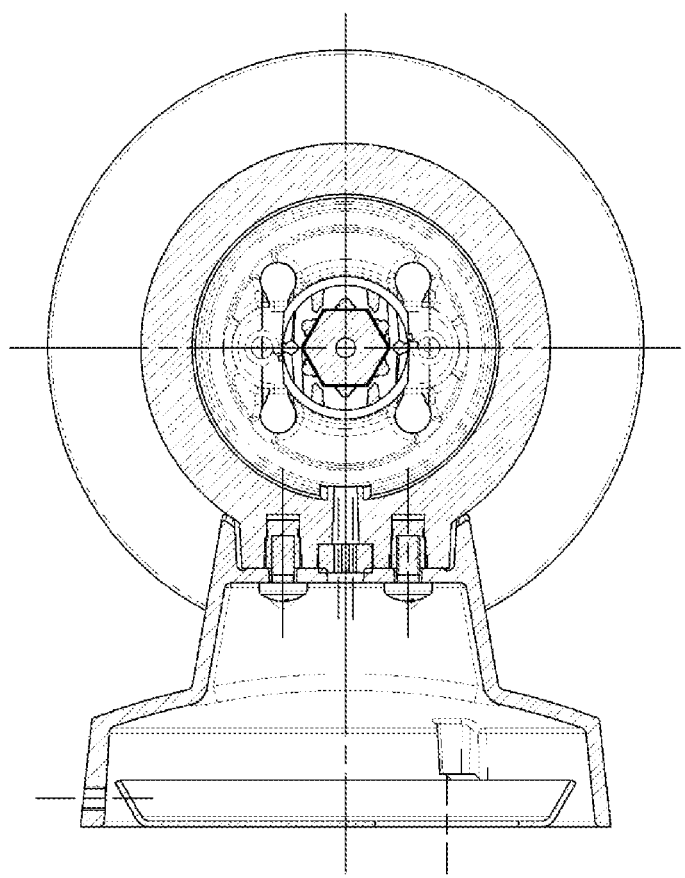
FIG. 4 show a second example of a lighting fixture adapted to emit nearly laminar and substantially two-dimensional light flows, comprising the device according to the present invention.

With reference to the accompanying FIG. 3, a first embodiment of the device object of the present invention includes a screen 12 of opaque material, adapted to be arranged in the vicinity of the punctiform light sources 13 of the lighting fixture 10 and provided, at, said punctiform light sources 13, with at least one slot 14 adapted to allow the passage of the main direct light flow 15, emitted by said punctiform light sources 13, and to prevent the passage of any secondary light flows due to reflections 11 affecting said main light flow 15.

Said slot can advantageously be made with the edges provided with an inclined chamfer 16, such as facing said punctiform light sources 13, as shown in the accompanying FIG. 3.

Said chamfer has the function to eliminate any parasitic reflections directed towards the lens of light rays emitted by said punctiform light sources, which could occur on said edges if without chamfer.

The device according to the present invention is implemented in the appropriate manners required by the special arrangement of said punctiform light sources 13 of the lighting fixture to which said device is applied. In the preferred embodiment shown in the accompanying FIGS. 3a-3e and 5, for example, it may have the shape of a cylindrical portion, in the preferred embodiment shown in the accompanying FIGS. 4 and 6, for example, it may have a cylindrical shape.

Other preferred embodiments include prismatic, semi-prismatic and linear shapes, the latter to be used with lighting fixtures comprising a plurality of LEDs arranged in linear strips.

Figure 5:
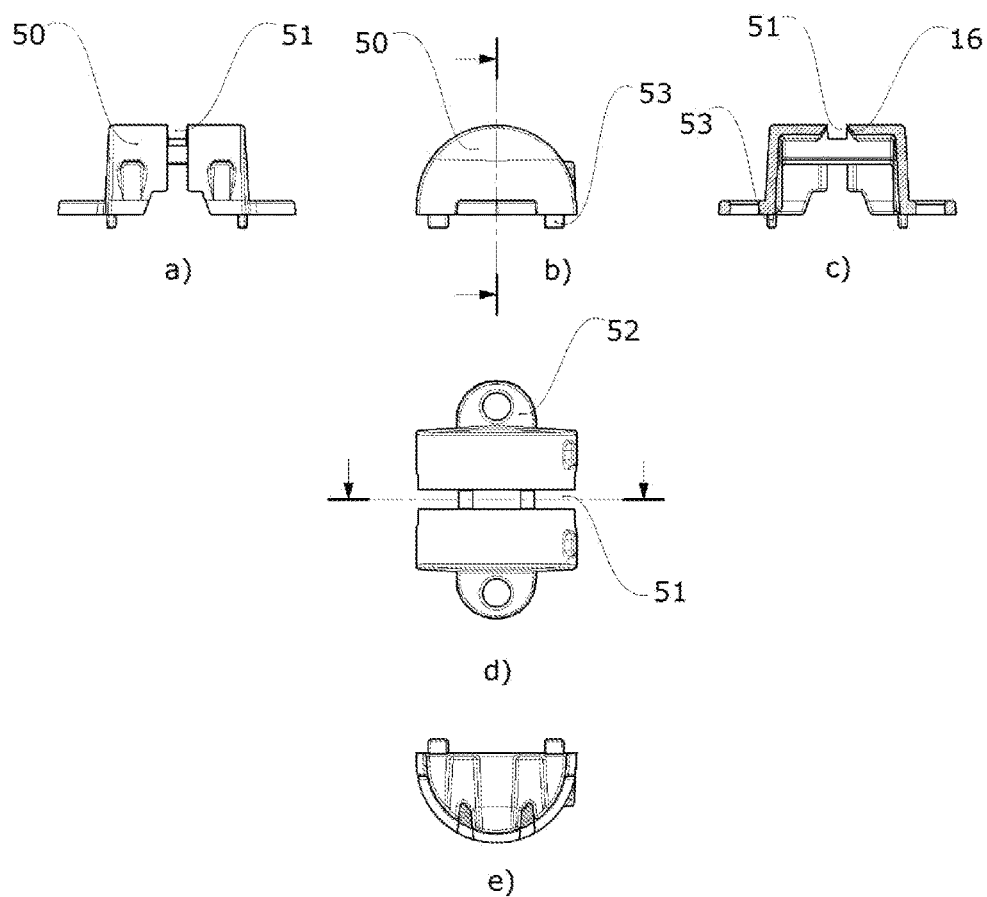
FIG. 5 shows a first preferred embodiment of the device according to the present invention.

In more detail and with reference to the accompanying FIGS. 3 and 5, a first preferred embodiment of the device according to the present invention is adapted to be used with arrays of punctiform light sources which extend over an arc of approximately 180°.

Said first preferred embodiment includes a screen 50 of opaque material and approximately half-cylindrical or semi-prismatic in shape, as shown in the accompanying FIG. 5, adapted to contain said array of punctiform light sources and provided with appropriate fixing means and with a slot 51 in a position corresponding to said array of punctiform light sources. As seen above, said slot 51 can advantageously be made with the edges provided with an inclined chamfer 16, such as facing said punctiform light sources 13.

As said above, said chamfer 16 has the function to, eliminate any parasitic reflection directed towards the lens of light rays emitted by said punctiform light sources, which could occur on said edges if without chamfer.

Figure 6:
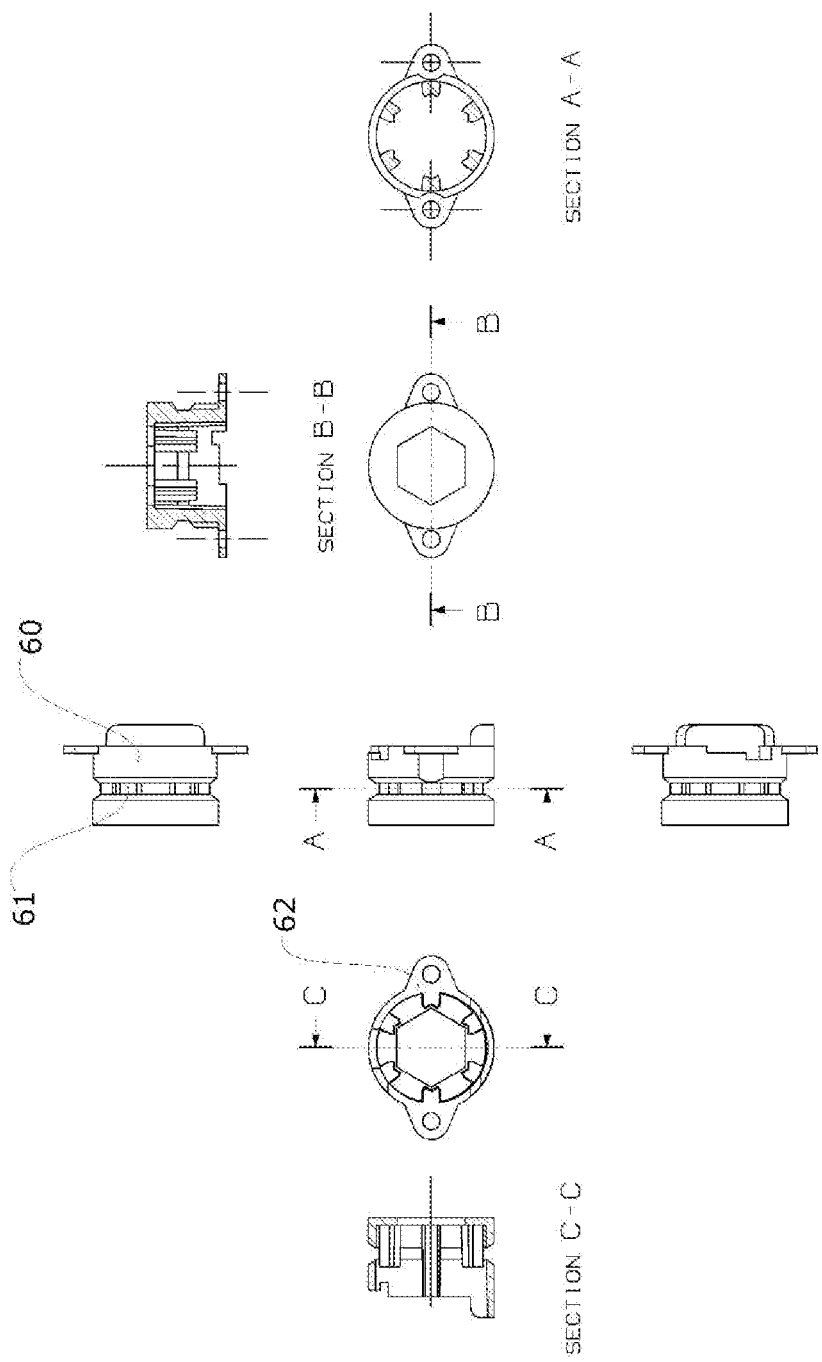
FIG. 6 shows a second preferred embodiment of the device according to the present invention.
Figure 7:
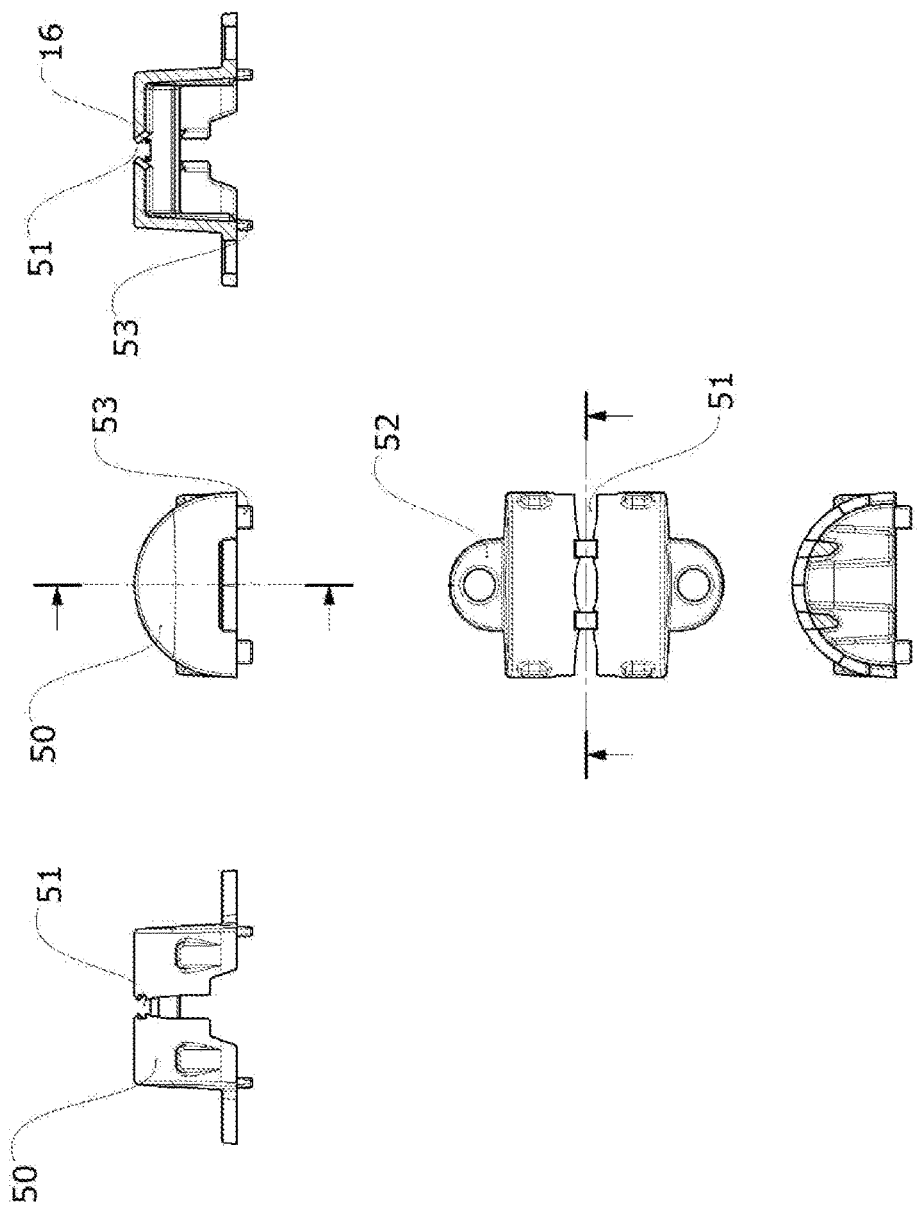
FIG. 7 shows a third preferred embodiment of the device according to the present invention.

A second preferred embodiment of the device according to the present invention, with reference to the accompanying FIG. 6, is adapted to be used with arrays of punctiform light sources which extend over an arc of 360°. Said second preferred embodiment includes a screen 60 of opaque material and approximately cylindrical in shape, adapted to contain said array of punctiform light sources and provided with appropriate fixing means and with a slot 61 in a position corresponding to said array of punctiform light sources. As seen above, said slot 61 can advantageously be made with the edges provided with an inclined chamfer 16, such as facing said punctiform light sources.

Advantageously, moreover, said first preferred embodiment of the device according to the present invention may include fixing, centering and positioning means adapted to ensure that, when installed, said slot 51 is aligned with said array of punctiform light sources. Said fixing means may comprise perforated tabs 52 for fixing by means of screws, said centering and positioning means may include pins 53 adapted to engage with corresponding centering holes.

With reference to the accompanying FIG. 6, a second preferred embodiment of the device according to the present invention is adapted to be used with arrays of punctiform light sources which extend over an arc of approximately 360°.

Said second preferred embodiment includes a screen 60 of opaque material and approximately cylindrical or prismatic in shape, as shown in the accompanying FIG. 6, adapted to contain said array of punctiform light sources and provided with appropriate fixing means and with a slot 61 in a position corresponding to said array of punctiform light sources. As seen above, said slot 61 can advantageously be made with the edges provided with an inclined chamfer 16, such as facing said punctiform light sources 13.

Advantageously, moreover, said first preferred embodiment of the device according to the present invention may include centering and positioning means adapted to ensure that, when installed, said slot 61 is aligned with said array of punctiform light sources. Said fixing means may include, for example, perforated tabs 62 for fixing by means of screws.

Advantageously, finally, said at least one slot 14, 51, 61 can be made with a non constant but variable width as a function of the distance from said punctiform light sources. In more detail, said slot 14, 51, 61 can be such as to have a maximum width at the point of smallest distance with respect to the closest punctiform lighting source and minimum at the point of greatest distance with respect to the closest punctiform lighting source. This obviates the drawback of having a light emission, from said slot 14, 51, 61, with a width greater at the periphery and smaller in the middle. This drawback occurs when said slot 14, 51, 61 is not arranged on a circumference centered in the lighting source and is thus not substantially equidistant in every part thereof from said lighting source. In such a case, the light beam emitted by said light source will be such as to impinge different parts of said slot 14, 51, 61 with different widths and, consequently, the light emission from said slot 14, 51, 61 will be such as to have a greater width at the periphery and smaller at the center, causing the drawback described.

Finally, the device according to the present invention can be made with a slot having a profile with such a shape as to shape the light beam, and thus the luminous effect produced, according to the desired profile. A slot 14, 51, 61 shaped as a sawtooth, for example, will produce such a light beam as to, project a sawtooth profile on the illuminated surface.

The invention claimed is:

1. A device for shaping the light beam emitted by a lighting fixture comprising a plurality of punctiform light sources aligned in a way to share a common axial plane, an opaque screen adapted to be arranged in the vicinity of the punctiform light sources of said lighting fixture, said screen comprising at least one slot, facing said punctiform light sources, adapted to allow the passage of a main direct light flow, emitted by said punctiform light sources along said common axial plane, said screen being adapted to prevent a passage of any lateral light flows and secondary light flows resulting from reflection phenomena affecting, said main direct light flow.

2. The device according to claim 1, wherein said at least one slot has variable width depending on a distance from said punctiform light sources.

3. The device according to claim 2, wherein said at least one slot has a maximum width at a point of smallest distance with respect to a closest punctiform lighting source and minimum at a point of greatest distance with respect to the closest punctiform lighting source.

4. The device according to claim 1, wherein said at least one slot comprises edges provided with an inclined chamfer.

5. The device according to claim 4, wherein said inclined chamfer faces towards said punctiform light sources.

6. The device according, to claim 1, wherein said at least one slot has such a shape as to shape the light beam produced, according to a desired profile so as to project said profile on a surface illuminated by said light beam.

* * * * *